No. 628,074. Patented July 4, 1899.
J. E. COTTER.
BICYCLE ALARM BELL.
(Application filed Mar. 10, 1899.)
(No Model.)
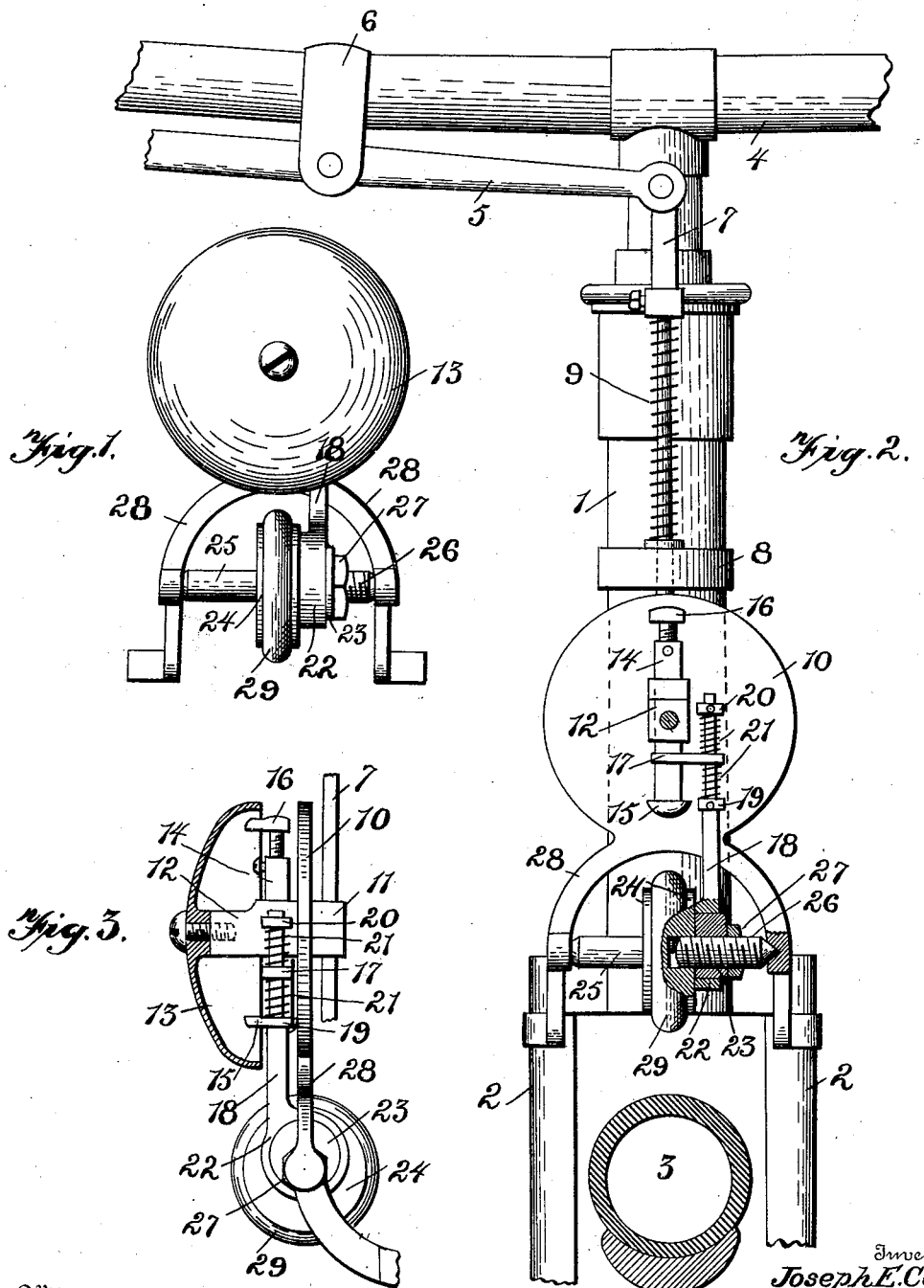
Witnesses
Geo. E. Frech.
J. H. Jochum Jr.
Inventor
Joseph E. Cotter.
By Collamer & Co.
Attorneys

UNITED STATES PATENT OFFICE.

JOSEPH E. COTTER, OF ST. LOUIS, MISSOURI.

BICYCLE ALARM-BELL.

SPECIFICATION forming part of Letters Patent No. 628,074, dated July 4, 1899.

Application filed March 10, 1899. Serial No. 708,540. (No model.)

*To all whom it may concern:*

Be it known that I, JOSEPH E. COTTER, a resident of St. Louis, Missouri, have invented a certain Improvement in Alarm-Bells for Bicycles and Similar Wheel-Vehicles, of which the following is a specification.

My invention relates to bells for bicycles and kindred vehicles that may be operated through the medium of a rotating wheel and may be sounded at the will of the rider through the medium of the operating mechanism that is contacted with a rotating wheel.

The novel features of my invention consist, first, in the construction of the sounding mechanism; second, the means whereby the same is held in place, and, third, the means employed to shift the sounding mechanism into and out of operative contact with the rotating wheel.

In the accompanying drawings, Figure 1 is a front elevation of the bell detached from the vehicle. Fig. 2 is a detail front or end elevation of a bicycle, showing the operating mechanism in elevation and bell removed. Fig. 3 is a detail side elevation with bell in section.

1 is a steering-head of a bicycle of the ordinary construction.

2 are the forks, in the lower end of which is journaled the wheel 3. On the upper end of head 1 is the handle or steering bar 4.

5 is an operating-lever fulcrumed to the strap 6, surrounding the handle-bar 4. To one end of said handle-bar is pivoted the rod 7, extending down and passing through a guide 8, secured to the steering-head, and 9 is a recovery-spring, one end of which bears against the guide and the other against a shoulder on the rod 7.

Coming now more particularly to the present invention, 10 is a plate, on the rear side of which is a lug 11, through which passes the rod 7. The lug may be fixed or adjustably secured by any suitable means.

12 is a post projecting from the front side of plate 10 and to which is secured the bell 13 by a screw or any other means.

14 is a tappet-bar, square in cross-section or of any other suitable configuration, to the terminals of which are secured tappets 15 and 16, one permanent and the other removable, and 17 is an arm adjustably secured to the bar 14 and projecting laterally therefrom, and through the outer end of which passes freely the connecting-bar 18, having a fixed collar 19 and an adjustable collar 20, (or both of which may be adjustable, if desired,) and between said collars and arm 17 are located springs 21. The lower end of the connecting-bar is provided with an eye 22, adapted to encircle an eccentric 23, which is secured to the adjustable section 26 of the shaft. This section is screw-threaded, and one end enters the hub 24. The section 25 may be secured to the other side of the hub 24 of the wheel 29 in any desirable manner, but is preferably integral therewith. The eccentric 23 is screwed onto the section 26, and a jam-nut 27 rests against the side thereof. The outer end of each section of the shaft is conical and fits a socket in the lower end of a fork 28 of the plate 10. 29 is a rubber-rimmed wheel around said hub.

Having thus described the construction of my invention, the operation is as follows: As indicated in Fig. 2, all parts are in their normal position. To bring them into operative position, the lever 5 is operated by the rider, depressing the rod 7 and all parts secured thereto, thus contacting the rim 29 on the hub 24 with the wheel 3, when the shaft will be rotated and the eccentric thereon will cause the connecting-rod 18 to reciprocate, which in turn reciprocates the tappet-arm 17 through the connection between said members, the spring connection 21 causing a sharp and elastic contact to be made by the tappets with the bell 13 and by such contact causing an alarm. The operating mechanism that is carried by the rod 7 is returned to its normal position by the spring 9 upon a release of the handle 5 by the rider.

The construction here shown may be attached to the ordinary brake mechanism that is now adopted in bicycle construction and not detract from or alter the construction of the sounding mechanism or means for operating same by contact with a rotating wheel.

Having thus described my invention, what I claim is—

1. An alarm-bell for bicycles consisting of a reciprocatory tappet-arm, means whereby the same is elastically operated, and an eccentric operated by contacting with a rotating wheel substantially as shown and described.

2. An alarm-bell for bicycles consisting of a plate upon which is mounted a bell, and mechanism to strike said bell, means for operating said mechanism consisting of an eccentric mounted on a sectional shaft, a wheel on said shaft, adapted to be contacted with a rotating wheel, and conical bearings at the terminals of the sectional shaft, having bearing in the forks of the carrying-plate as shown.

3. An alarm-bell for bicycles consisting of a reciprocating plate to which is secured a bell, tappets therein, an eccentric for operating the same, an operating-rod to which said plate is secured, a lever fulcrumed to the handle-bar, and means whereby said lever is returned to the normal position as shown.

4. An alarm-bell for bicycles consisting of a plate, a reciprocating bar mounted thereon, tappets at the terminals of said bar, an arm on said rod, an elastic connection to said arm, means for reciprocating said elastic connection, and a bell, the rim of which is in the path of the tappet-bar substantially as shown and described.

5. An alarm-bell for bicycles, consisting of a reciprocating plate, a bell secured thereon, reciprocating tappets for said bell, a sectional shaft mounted at the lower end of the plate one of its sections being provided with threads; a driving-wheel on the shaft, an eccentric on the threaded portion of the shaft, a bar having an eye at one end surrounding the eccentric, a flexible connection between the other end and the bell-tappets, and means for moving the plate, substantially as set forth.

6. An alarm-bell for bicycles consisting of a reciprocating plate, a bell secured thereon, reciprocating tappets for said bell, a sectional shaft mounted at the lower end of the plate and with its ends journaled in bearings in a fork of said plate, the sections being adjustable to each other; a driving-wheel on the shaft, an eccentric on the shaft, a jam-nut resting against the eccentric, a bar having an eye at one end surrounding the eccentric, a flexible connection between the other end and the bell-tappets, and means for moving the plate, substantially as set forth.

In testimony whereof I affix my signature in presence of two witnesses.

JOSEPH E. COTTER.

Witnesses:
JOSEPH E. PAER,
R. S. O'BRIEN.